H. STEWART.
SEAT FOR AGRICULTURAL MACHINES.
APPLICATION FILED MAY 9, 1918.
1,370,235.
Patented Mar. 1, 1921.
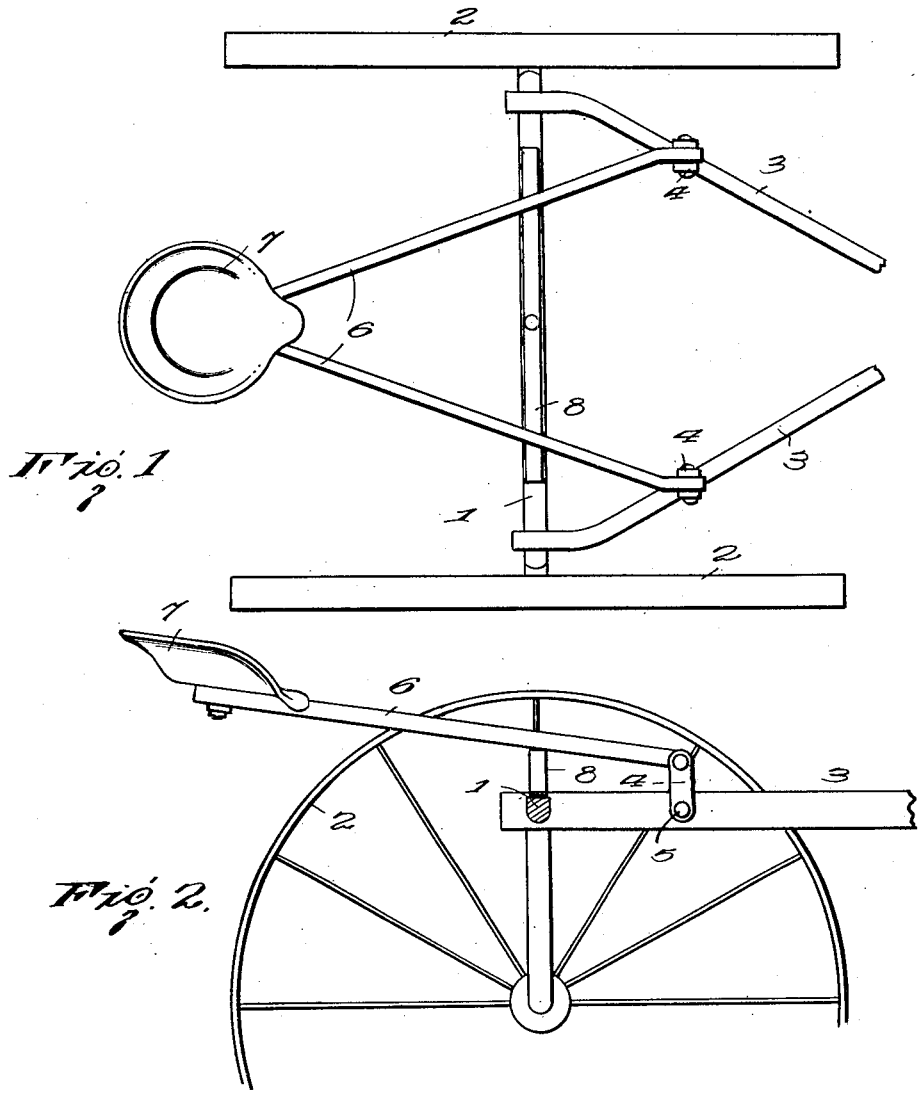
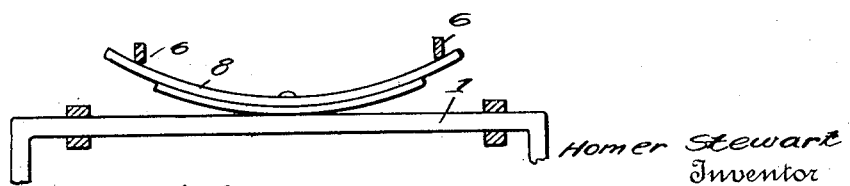
Homer Stewart
Inventor
By Geo. P. Kimmel
Attorney

UNITED STATES PATENT OFFICE.

HOMER STEWART, OF WINSLOW, ILLINOIS.

SEAT FOR AGRICULTURAL MACHINES.

1,370,235.  Specification of Letters Patent.  Patented Mar. 1, 1921.

Application filed May 9, 1918. Serial No. 233,550.

*To all whom it may concern:*

Be it known that I, HOMER STEWART, a citizen of the United States, residing at Winslow, in the county of Stephenson and State of Illinois, have invented certain new and useful Improvements in Seats for Agricultural Machines, of which the following is a specification.

This invention relates to improvements in attachments for agricultural machines and it is the principal object of the invention to provide a novel spring supported seat therefor whereby the jolting of a rider will be eliminated during the movement of the machine over a field or other uneven surface.

The improvements in the details and arrangements of parts will be apparent from an inspection of the accompanying drawings, in connection with the specific description hereinafter contained, wherein the preferred embodiment of the invention is disclosed for the purpose of imparting a full understanding thereof.

In the drawings:

Figure 1 is a top plan of a portion of an agricultural machine having my improved seat applied thereto, Fig. 2 is a fragmentary vertical longitudinal section therethrough, and Fig. 3 is a fragmentary transverse section through the same.

Having more particular reference to the drawings, in connection with which like reference characters will designate corresponding parts throughout the several views, 1 represents the axle of the machine and 2 the wheels which are mounted on the opposite ends thereof. Engaged with the axle at points in proximity to its opposite ends and with another fixed portion of the machine, not shown, are the usual seat bars or irons 3, which as will be noted have bifurcated bearing arms 4 secured thereto by rivets 5, or the like.

Pivoted in the bifurcated ends of the bracket arms 4 are seat supporting arms 6, which as will be noted are arranged to provide a substantially V-shaped support and carry an ordinary form of seat 7 upon their free ends.

Secured intermediate its ends to a portion of the axle 1 is a suitable form of semi-elliptical leaf spring 8, the free ends of which, as will be noted, are arranged in spaced relation from the axle 1 and serve to receive the intermediate portions of the seat supporting arms 6 thereon as clearly shown in Fig. 3. As a consequence, the arms will be resiliently supported when the operator or rider is arranged in the seat 7, thus preventing the jolting of the rider during the movement of the machine over a field or other uneven surface; pivotal movement of the arm 6 is allowed, which in turn is quickened by means of the spring 8.

It, of course, will be understood that various forms of quickening or spring means may be substituted for that shown, such as conditions or preference may dictate, the underlying principle of the invention being to provide pivotal seat supporting arms capable of engaging with a form of quickening means for fully absorbing such shock or jolts as may be transmitted thereto.

Manifestly, the construction shown is capable of considerable modification and such modification as is within the spirit of my claim I consider within the spirit of my invention.

I claim:

The combination with a vehicle having an axle with forwardly converging seat bars carried thereby; of a semi-elliptical spring secured midway its ends to said axle on the upper face thereof with its concave portion facing upwardly, said spring being arranged longitudinally on said axle, upstanding brackets carried by said seat bars in advance of and spaced from said axle, seat supporting arms pivoted at one end to said brackets and extended rearwardly and converging toward and meeting at their rear ends at a point in rear of said axle, said arms resting freely on said spring near the ends thereof whereby the arms are yieldably supported and their movement on their pivots permitted, and a seat carried by the rear ends of said arms.

In testimony whereof, I affix my signature hereto.

HOMER STEWART.